US011889597B2

(12) United States Patent
Lin et al.

(10) Patent No.: US 11,889,597 B2
(45) Date of Patent: Jan. 30, 2024

(54) DUAL DIMMING MODULAR LIGHT SYSTEM

(71) Applicant: Tivoli, Inc., Irvine, CA (US)

(72) Inventors: Lien-Chung Lin, Brea, CA (US); Bey Shing Jang, Santa Ana, CA (US)

(73) Assignee: Tivoli, Inc., Irvine, CA (US)

( * ) Notice: Subject to any disclaimer, the term of this patent is extended or adjusted under 35 U.S.C. 154(b) by 0 days.

(21) Appl. No.: 17/843,637

(22) Filed: Jun. 17, 2022

(65) Prior Publication Data

US 2022/0408527 A1 Dec. 22, 2022

Related U.S. Application Data

(60) Provisional application No. 63/211,966, filed on Jun. 17, 2021.

(51) Int. Cl.
*H05B 45/10* (2020.01)
*H05B 45/325* (2020.01)
*H05B 45/46* (2020.01)

(52) U.S. Cl.
CPC ........... *H05B 45/10* (2020.01); *H05B 45/325* (2020.01); *H05B 45/46* (2020.01)

(58) Field of Classification Search
CPC ...... H05B 45/10; H05B 45/30; H05B 45/325; H05B 45/46
See application file for complete search history.

(56) References Cited

U.S. PATENT DOCUMENTS 8,207,687 B1 6/2012 Rhodes
2002/0176257 A1 11/2002 Cummings et al.
2013/0187562 A1 7/2013 Keith et al.
2016/0014867 A1 1/2016 Luk
2017/0094742 A1* 3/2017 Nakamura ........... H05B 47/115
2019/0110349 A1* 4/2019 Tsukahara .......... G03B 21/2053
2021/0153315 A1 5/2021 Yu
2021/0156530 A1 5/2021 Huang
(Continued)

FOREIGN PATENT DOCUMENTS

CN 30482718 S 9/2018
EP 2311025 B1 9/2015
(Continued)

OTHER PUBLICATIONS

CABLEMATRIC—Description and Specification for Garland Lamp Holder E27 for Rectangular Wire 6×10 MM. 2 pages. Accessed on Feb. 25, 2022. Retrieved from https://cablematric.com/en/products/garland-lamp-holder-e27-for-rectangular-wire-6x10-mm-NT049.
(Continued)

*Primary Examiner* — Jimmy T Vu

(74) *Attorney, Agent, or Firm* — Kilpatrick Townsend & Stockton LLP

(57) ABSTRACT

A light fixture of a light system is configured to be dimmable using a dimming signal that is either a direct-current (DC) dimming signal or an alternating-current (AC) dimming signal. For example, a 0-10 volt DC dimming signal could be used, or a 120 volt AC dimming signal could be used. A dimming controller in the light fixture is configured to receive both a DC and an AC dimming signals and adjust a brightness and/or color of a light based on the dimming signal.

20 Claims, 9 Drawing Sheets

(56) References Cited

U.S. PATENT DOCUMENTS

2022/0082233 A1* 3/2022 Kopitzke .............. F21V 23/003

FOREIGN PATENT DOCUMENTS

KR 20170034307 A 3/2017
WO 2019090810 A1 5/2019

OTHER PUBLICATIONS

Builders SA—Create Your Own Rope Lights—DIY. 2 pages. Accessed on Feb. 25, 2022. Retrieved from https://sv-se.facebook.com/BuildersSA/videos/255707631802790/7video_source=permalink.

Product Description: Wireless RGBW 4 Channel LED Controller with Channel Pairing, aspect LED, a Wilson Tool Company, accessed on Apr. 21, 2022, retrieved from https://www.aspectled.com/collections/led-controllers/products/wireless-rgbw-4-channel-led-controller-channel-pairing?gclid=cj0KCQiAhP2BBhDdARIsAJEzXIEEQB1WyBFteLqsFiAkdQN20FqW2rl-dKebk1pWLFZZSa3G9FIULUMaAolrEALw_wcB 3 pages.

* cited by examiner

DUAL DIMMING MODULAR LIGHT SYSTEM

CROSS-REFERENCES TO RELATED APPLICATIONS

This application claims the benefit of U.S. Provisional Application Ser. No. 63/211,966, filed on Jun. 17, 2021, entitled "DUAL DIMMING MODULAR LIGHT SYSTEM," the disclosure of which is incorporated by reference herein in its entirety.

BACKGROUND

This disclosure generally relates to lighting, and without limitation to dimmable, modular lighting for use as cove lighting. Cove lighting can provide an indirect light source that can be used to direct light up or down, such as toward a ceiling, wall, or floor). Cove lighting can be used as primary lighting or accent lighting. Cove lighting can be used to hide fixtures and/or to provide an even light.

BRIEF SUMMARY

In some configurations, a lighting system comprises a first light-emitting device; a second light-emitting device; a bus line, a first controller, and a second controller. The bus line is configured to transmit a first dimming signal to the first controller and to the second controller, wherein the first dimming signal is generated from a direct current (DC) dimming signal; and transmit a second dimming signal to the first controller and to the second controller, wherein the second dimming signal is generated from an alternating current (AC) dimming signal. The first controller is configured to receive the first dimming signal; receive the second dimming signal; and/or transmit a third dimming signal to the first light-emitting device. The third dimming signal is based on the first dimming signal or the second dimming signal. A brightness of the first light-emitting device is based on the third dimming signal. The second controller is configured to receive the first dimming signal; receive the second dimming signal; and/or transmit a fourth dimming signal to the second light-emitting device. The fourth dimming signal is based on the first dimming signal or the second dimming signal. A brightness of the second light-emitting device is based on the fourth dimming signal. In some embodiments, the second controller is configured to turn off the second light-emitting device if the first light-emitting device is turned off; the first light-emitting device and the first controller are in a housing of a first light fixture; and/or the second light-emitting device and the second controller are in a housing of a second light fixture.

In some configurations, a lighting system comprises a light-emitting device and a controller. The controller is configured to receive a first dimming signal, wherein the first dimming signal is a direct current (DC) dimming signal; receive a second dimming signal, wherein the second dimming signal is an alternating current (AC) dimming signal; transmit a third dimming signal to the light-emitting device, wherein the third dimming signal is based on the first dimming signal or the second dimming signal, and a brightness of the light-emitting device is based on the third dimming signal. In some embodiments, the light-emitting device and the controller are in a housing of a light fixture; the housing is coupled with a bracket configured to rotate with respect to the housing; the first dimming signal is a 0-10V dimming signal; the second dimming signal in an electronic low voltage (ELV) dimming signal; the controller comprises a combiner; the combiner is configured to receive a first modified signal, wherein the first modified signal is based on the first dimming signal, receive a second modified signal, wherein the second modified signal is based on the second dimming signal, and/or transmit the third dimming signal; the combiner in an operational amplifier; the controller is configured to modify the second dimming signal to generate the second modified signal, wherein the second dimming signal is modified by converting the second dimming signal from a pulse-width modulation signal into a digital pulse-width modulation signal, to generate a converted signal, and/or filtering the converted signal using a voltage follower to generate the second modified signal; modifying the second dimming signal further comprises rectifying the second dimming signal before converting the second dimming signal from the digital signal to the analog signal; the light-emitting device emits light using only light emitting diodes; the controller is an application specific integrated circuit; the controller prioritizes the DC dimming signal if the controller receives the DC dimming signal and the AC dimming signal concurrently; the lighting system comprises a bus line; the light-emitting device is a first light-emitting device; the controller is a first controller; the lighting system comprises a second light-emitting device and a second controller; the bus line is configured to transmit the first dimming signal to the first controller and to the second controller, transmit the second dimming signal to the first controller and to the second controller, and/or the second controller is configured to receive the first dimming signal, receive the second dimming signal, and transmit a fourth dimming signal to the second light-emitting device; the fourth dimming signal is based on the first dimming signal or the second dimming signal; a brightness of the second light-emitting device is based on the fourth dimming signal; and/or the second controller is configured to turn off the second light-emitting device if the first light-emitting device is turned off.

In some configurations, a method for a lighting system comprising receiving a first dimming signal, at a controller, wherein the first dimming signal is a direct current (DC) dimming signal; receiving a second dimming signal, at the controller, wherein the second dimming signal is an alternating current (AC) dimming signal; and transmitting, using the controller, a third dimming signal to a light-emitting device, wherein the third dimming signal is based on the first dimming signal or the second dimming signal and a brightness of the light-emitting device is based on the third dimming signal. In some embodiments, the controller does not check what type of light-emitting device is used; and/or the controller comprises a combiner. In some embodiments, the method further comprises receiving a first modified signal at the combiner, wherein the first modified signal is based on the first dimming signal; receiving a second modified signal at the combiner, wherein the second modified signal is based on the second dimming signal; transmitting the third dimming signal from the combiner; converting the second dimming signal from an pulse-wide modulation signal into a digital pulse-width modulation signal, to generate a converted signal; and/or filtering the converted signal using a voltage follower to generate the second modified signal.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

A light fixture of a light system is configured to be dimmable using a dimming signal that is either a direct-current (DC) dimming signal or an alternating-current (AC) dimming signal. For example, a 0-10 volt DC dimming signal could be used or a 120 volt AC dimming signal could be used. A dimming controller in the light fixture is configured to receive both a DC and an AC dimming signals and adjust a brightness and/or color of a light based on the dimming signal. In some embodiments, the AC dimming signal can be MLV (magnetic low-voltage), ELV (electronic-low voltage), or both. In some embodiments, the DC dimming signal can be 0-10V or 1-10V. By having a light system that can use two, or more, different types of dimming input, a lighting installer can use the same lighting system in different situations. For example, a lighting installer may not need to carry multiple different lighting systems (e.g., one lighting system for AC dimming and another lighting system for DC dimming). Having a lighting system compatible with more than one dimming source can help save the lighting installer from having to return to the shop or store to get the "correct" lighting system compatible with the dimming source. For example, if the lighting installer arrives to the job site with an AC dimming light fixture, but the job site uses DC dimming, then the lighting installer would have to go back to the shop to get a light fixture compatible with DC dimming. But if the light fixture was a dual dimming light fixture, then then lighting installer can install the light fixture whether the job site uses AC dimming or DC dimming.

Figure 1:
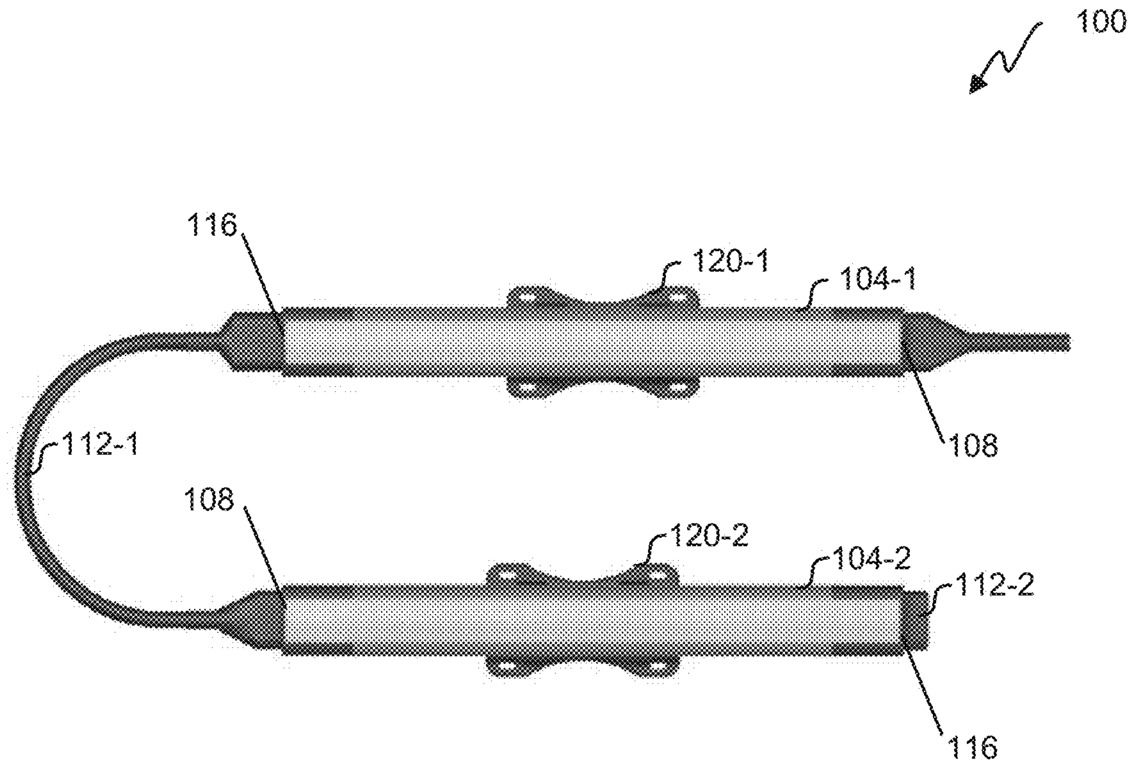
FIG. 1 illustrates an embodiment of a cove lighting system.

Referring first to FIG. 1, an embodiment of a cove lighting system 100 is illustrated. The cove lighting system 100 comprises a first light fixture 104-1 and a second light fixture 104-2. The first light fixture 104-1 receives a dimming signal from input 108. A first jumper 112-1 electrically couples the first light fixture 104-1 with the second light fixture 104-2. A second jumper 112-2 electrically couples the second light fixture 104-2 with the third light fixture. The cove lighting system 100 is modular because a variable number of light fixtures 104 can be added using jumpers 112. The light fixture 104 comprises an output port 116 for transmitting the dimming signal and/or power to another light fixture 104.

The input 108 is an input port. In some embodiments, the input port is a five-pin port. Three pins of the five-pin port are used for power and/or supplying the AC dimming signal. And two pins of the five-pin port are used to receive the DC dimming signal. For example, a T-connecter is used for DC dimming. The T-connector (e.g., connected to the input 108 of the first light fixture) uses a first branch for power and a second branch for the dimming signal. The first branch comprises three wires and is connected to a power source (e.g., an AC power source), to power the light fixture. The second branch is connected to a source for the DC dimming signal. In some configurations, only three pins of the input port are used for AC dimming (e.g., the three pins are used to power the light fixture and receive the AC dimming signal).

A bracket 120 is coupled with the light fixture 104 and used to mount the light fixture 104 to a surface. In some embodiments, the bracket 120 is configured to rotate with respect to the light fixture 104 (e.g., to provide more mounting options).

Figure 2:
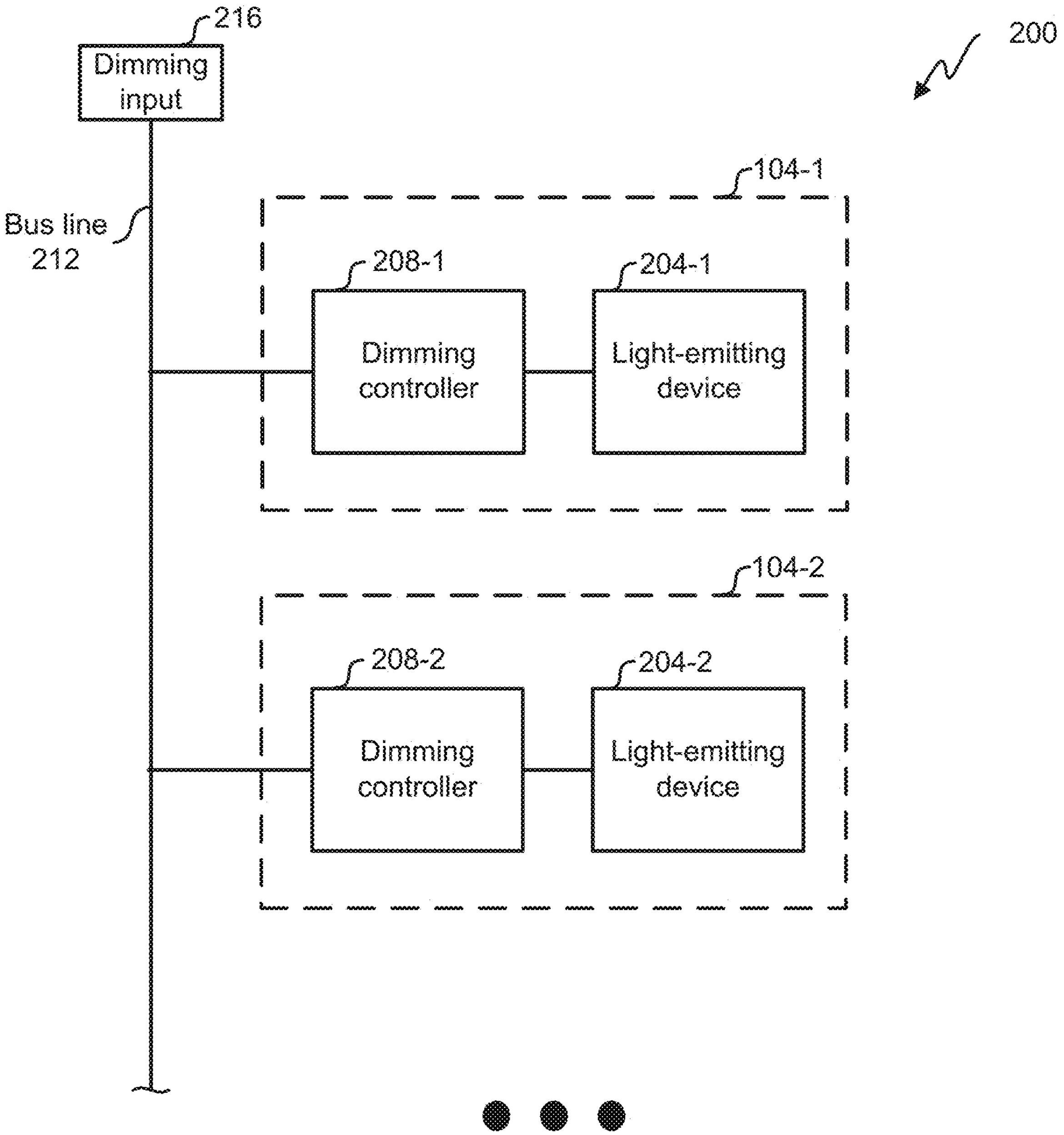
FIG. 2 is a block diagram of an embodiment of a lighting system.

FIG. 2 is a block diagram of an embodiment of a lighting system 200. The lighting system 200 comprises the first light fixture 104-1 and the second light fixture 104-2. The first light fixture 104-1 comprises a first light-emitting device 204-1 and a first dimming controller 208-1. The second light fixture 104-2 comprises a second light-emitting device 204-2 and a second dimming controller 208-2.

A bus line 212 is used to transmit a dimming signal to the first dimming controller 208-1 and to the second dimming controller 208-2. The bus line 212 receives the dimming signal from a dimming input 216 (e.g., a y-branch connector). Additional light fixtures 104 can be added as described in FIG. 1.

The bus line 212 is configured to transmit a first dimming signal to the first dimming controller 208-1 and to the second dimming controller 208-2 (e.g., and other dimming controllers 208 in other light fixtures 104). The first dimming signal is a direct current (DC) dimming signal.

The bus line 212 is configured to transmit a second dimming signal to the first dimming controller 208-1 and to the second dimming controller 208-2 (e.g., and other dimming controllers 208). The second dimming signal is an alternating current (AC) dimming signal.

The first dimming controller 208-1 is configured to receive the first dimming signal; receive the second dimming signal; and transmit a third dimming signal to the first light-emitting device 204-1. The third dimming signal is based on the first dimming signal or the second dimming signal. A brightness of the first light-emitting device 204-1 is based on the third dimming signal The second dimming controller 208-2 is configured to receive the first dimming signal; receive the second dimming signal; and transmit a fourth dimming signal to the second light-emitting device 204-2. The fourth dimming signal is based on the first dimming signal or the second dimming signal. A brightness of the second light-emitting device 204-2 is based on the fourth dimming signal. More light fixtures 104 with dimming controllers 208 and light-emitting devices 204 can be added.

Since each light fixture 104 has its own dimming controller 208, the light fixtures 104 are configured to by synchronized. For example, the second dimming controller 208-2 (and/or other controllers), in some embodiments, is configured to turn off the second light-emitting device 204-2 if the first light-emitting device 204-1 is turned off (e.g., and not just rely on the dimming signal from the bus line, so that light-emitting devices 204 appear to turn off simultaneously).

In some embodiments, the light-emitting device 204 in configured to emit light using only light-emitting diodes (LEDs). For example, the light-emitting device 204 does not use incandescent lighting (e.g., the dimming controller 208 does not work with incandescent bulbs). In some embodiments, the dimming controller 208 is configured to work with one, and only one, light-emitting device type (e.g., the dimming controller 208 works with LEDs and not with other types of lights).

Figure 3:
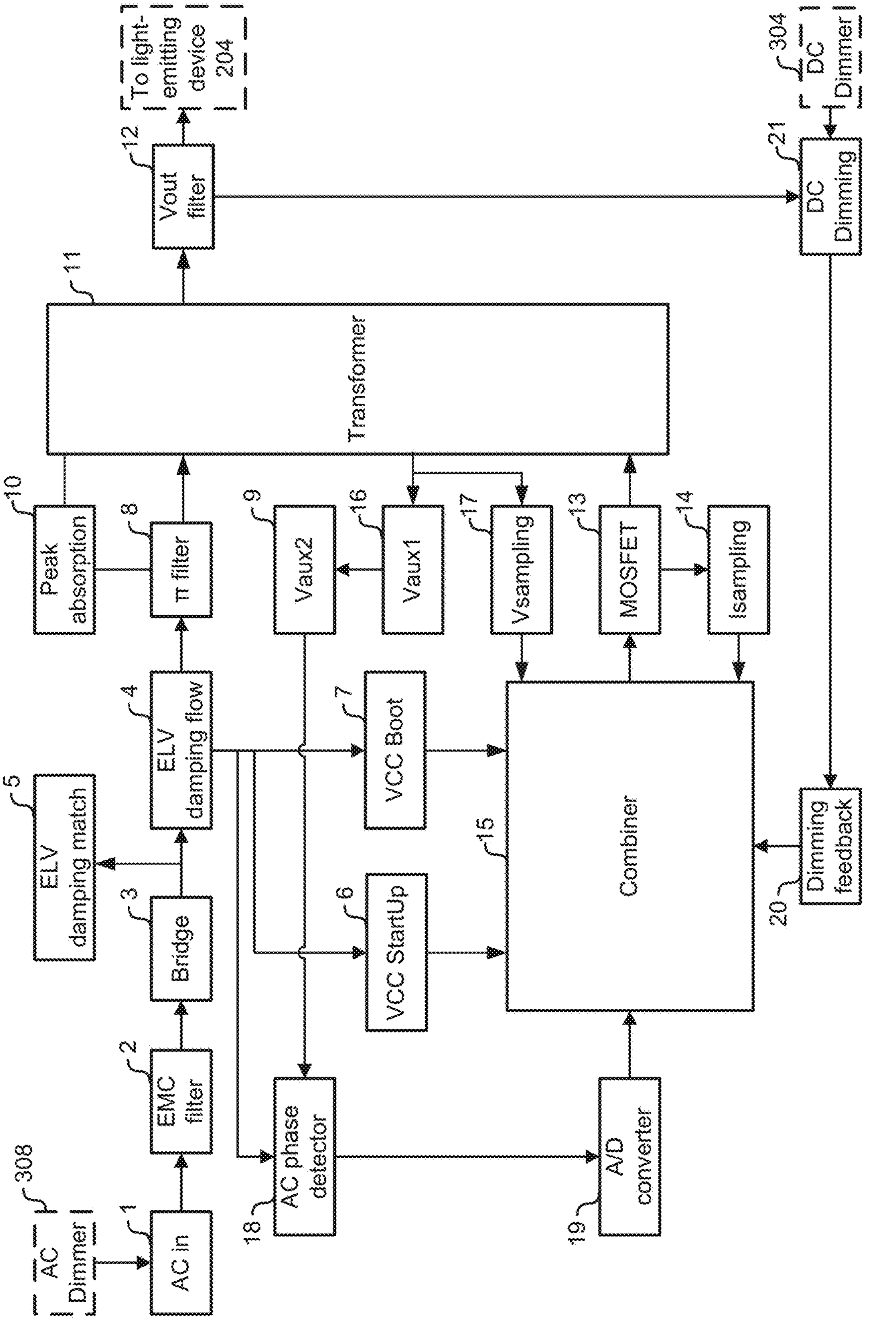
FIG. 3 is a block diagram of an embodiment of a dimming controller.

FIG. 3 is a block diagram of a controller (e.g., dimming controller 208 in FIG. 2). The controller is configured to receive a first dimming signal from a DC dimmer 304. The controller is configured to receive a second dimming signal from an AC dimmer 308. In some embodiments, the first dimming signal is a 0-10V dimming signal and the second dimming signal in an electronic low voltage (ELV) dimming signal.

The controller is configured to transmit a third dimming signal to the light-emitting device 204, based on the first dimming signal or the second dimming signal. A brightness (and/or color) of the light-emitting device 204 is based on the third dimming signal.

The AC dimming signal is received at AC in 1. The AC in 1 is configured to receive the AC dimming signal from the AC dimmer 308. For example, the AC in 1 could be configured to connect to a 120 volt or 277 volt electronic low voltage (ELV) dimmer. The AC dimming signal is passed through an EMC (electromagnetic compatibility) filter 2. The EMC filter 2 is an EMC noise filter.

Bridge 3 is used for Vac transfer to Vdc. The AC dimming signal can be rectified. An ELV damping flow 4 is used to compensate lower Vac at ELV dimming to keep startup consistency. ELV damping match 5 keeps ELV dimming circuit work at negative cycle. VCC startup 6 is used to startup the circuit at first turn on. VCC boot 7 is a VCC circuit that keeps startup consistency. $\pi$ filter 8 is a differential mode filter. Vaux2 9 is Vcc for ELV controller (AC phase detector). Peak absorption 10 is for circuit protect and EMC filter.

Transformer 11 is used as an energy conversion device. Vout filter 12 is used to control constant current for Vout. MOSFET 13 is the driver main component. Isampling 14 provides a current loop control to help keep constant current. Combiner 15 provides pulse-width modulation (PWM) output to control MOSFET on/off. Combiner 15 is sometimes referred to as a PWM controller. Vaux1 is Vaux for combiner 15. V sampling 17 is a voltage loop control to keep constant current.

AC phase detector 18 converts an AC phase waveform (e.g., an ELV phase waveform) to a square wave. The A/D converter 19 converts a square wave to an analog signal. The A/D converter provides a modified AC dimming signal to the combiner 15.

Dimming feedback 20 transfers the DC dimming signal to the combiner 15. The 0-10V dimming 21 is a 0-10V dimming circuit and connects to a 0-10V dimmer (signal can be resistor, PWM, or voltage). The Vout filter 12 connects to 0-10V dimming 21 to get feedback to dimming feedback 20 and thus to combiner 15. Feedback can be used to stabilize the Vout to LED fixture (ELV) and/or dimming the Vout by 0-10V signal.

In some embodiments, the controller is an application-specific integrated circuit (ASIC). For example, the controller does not receive user input or programming. In some embodiments, the controller does not check the type of light-emitting device (e.g., because the controller is configured control only one type of light-emitting device).

In some embodiments, the controller prioritizes one dimming signal over the other. For example, if the DC dimmer 304 and the AC dimmer 308 both provide a dimming signal to the controller at the same time, the controller is configured to prioritize the DC dimming signal over the AC dimming signal.

Figure 4:
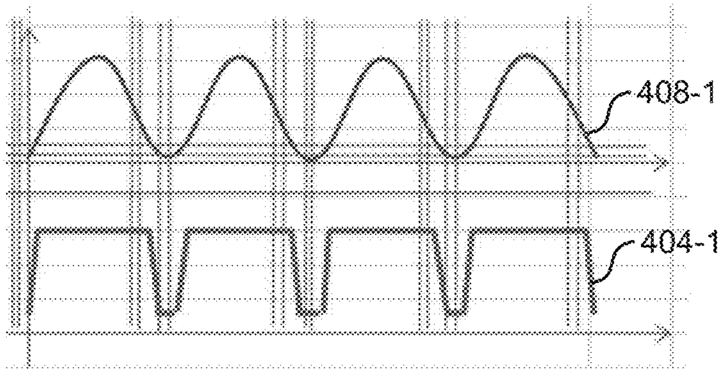
FIG. 4 is a graph of an embodiment of a first pulse-width modulation (PWM) signal.
Figure 5:
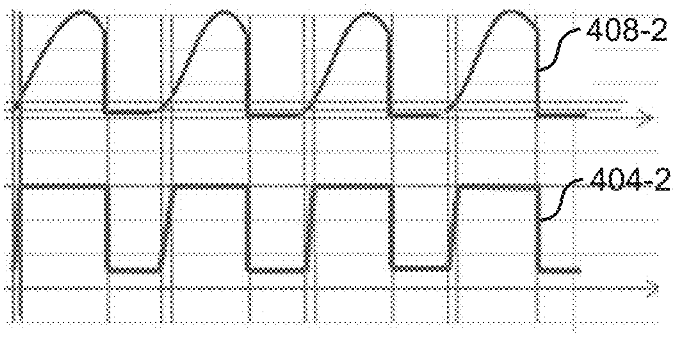
FIG. 5 is a graph of an embodiment of a second PWM signal.

FIG. 4 is a graph of an embodiment of a first PWM signal 404-1. The first PWM signal 404-1 is generated from a first ELV signal 408-1. FIG. 5 is a graph of an embodiment of a second PWM signal 404-2. The second PWM signal 404-2 is generated from a second ELV signal 408-2. The second PWM signal 404-2 is a lower dimming signal than the first PWM signal 404-1. The duty cycle of the second PWM signal 404-2 is less than the duty cycle of the first PWM signal 404-1. The PWM signal 404 is generated at the AC phase detector 18 in FIG. 3.

Figure 6:
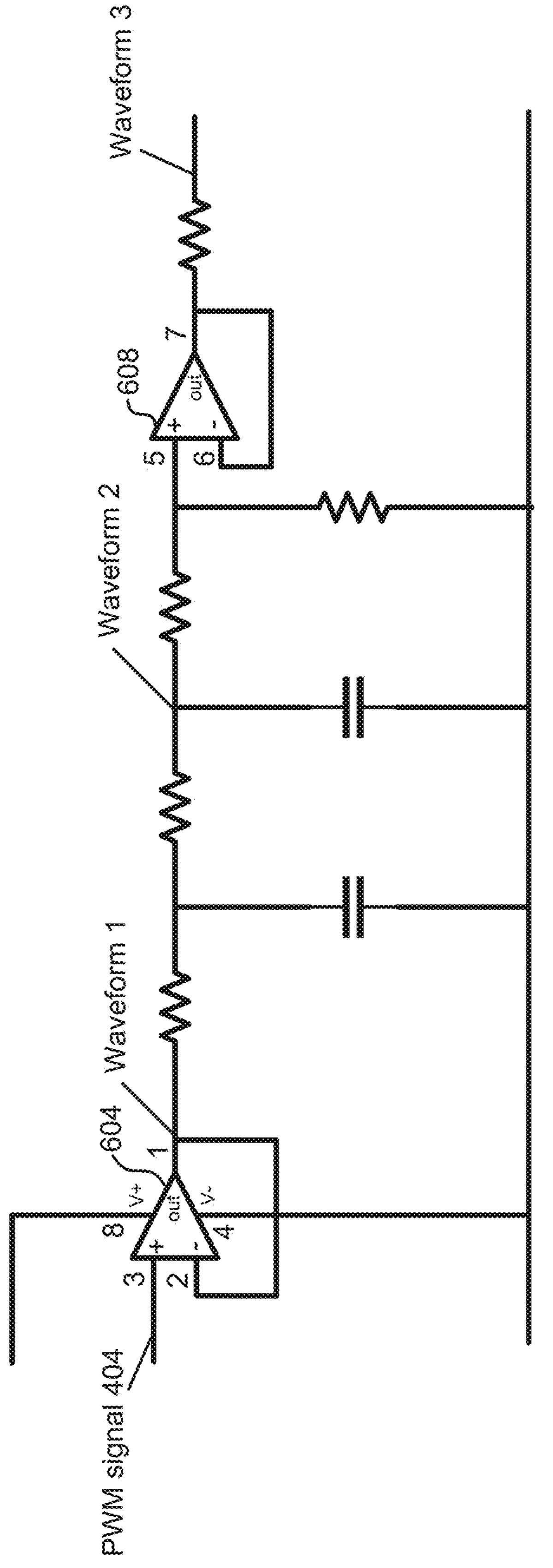
FIG. 6 is a diagram of an embodiment of an analog to digital converter.
Figure 7:
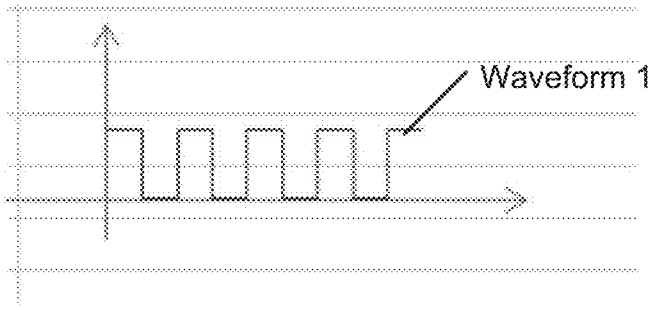
FIG. 7 is a graph of an embodiment of a first waveform.
Figure 8:
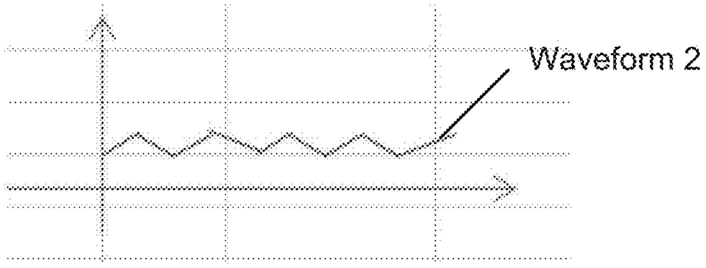
FIG. 8 is a graph of an embodiment of a second waveform.
Figure 9:
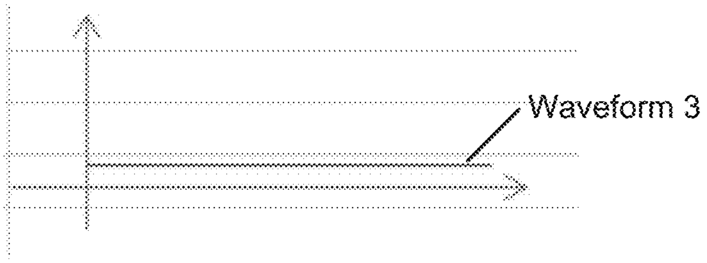
FIG. 9 is a graph of an embodiment of a third waveform.

FIG. 6 depicts a portion of an embodiment of an analog to digital converter (e.g., A/D converter 19). FIG. 7 is a graph of an embodiment of a first waveform. FIG. 8 is a graph of an embodiment of a second waveform. FIG. 9 is a graph of an embodiment of a third waveform.

The analog to digital converter comprises a first-stage filter 604 and a second-stage filter 608. The PWM signal 404 (e.g., from FIG. 4) is fed into the first-stage filter 604, and waveform 1 is generated. In some embodiments, the PWM signal 404 is limited to 6 volts. Waveform 1 is converted into waveform 2. After passing through the second-stage filter 608, waveform 3 is generated. At the second-stage filter 608, the dimming signal is converted into a DC signal.

Waveform 1 is a converted AC sinewave to a PWM digital signal. In some embodiments, max 70% PWM and min 15% PWM. In waveform 2, the PWM digital signal is converted to a triangle waveform, with Vpeak max of 3.5 volts and Vpeak min of 0.8 volts. Waveform 3 is a converted triangle waveform to DC voltage level, Vdc max 2 volts; Vdc min 0.5 volts. Vdc level 0-1.8 volts is used to control current from 0% to 100%.

The first-stage filter 604 is used to convert an AC sinewave into a PWM digital signal (e.g., waveform 1). The second-stage filter 608 is an op amp used as a voltage follow (e.g., it has a high input impedance and can improve stability, improve load capacity; and/or prevent waveform distortion). In some embodiments, the first-stage filter 604 and the second-stage filter 608 is an op amp.

In some configurations, the controller is configured to modify the second dimming signal (e.g., the AC dimming signal) to generate a second modified signal, wherein the second dimming signal is modified by: (1) converting the second dimming signal from a pulse-width modulation signal into a digital pulse-width modulation signal, to generate a converted signal (e.g., using the first-stage filter 604); and/or (2) filtering the converted signal using a voltage follower to generate the second modified signal (e.g., using the second-stage filter 608).

Figure 10:
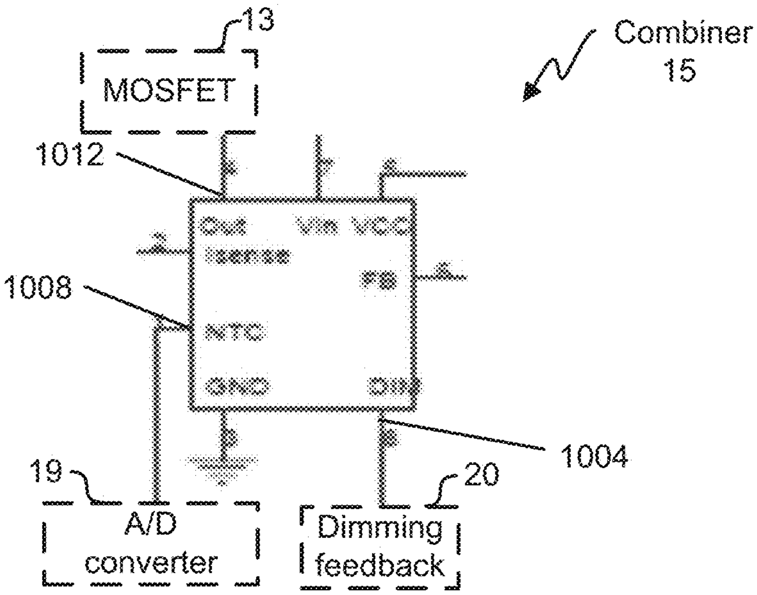
FIG. 10 is a diagram of an embodiment of a combiner.

FIG. 10 is a diagram of an embodiment of the combiner 15. The combiner 15 is sometimes referred to as a PWM controller. The combiner 15 is configured to receive a first modified signal at input 1004. The first modified signal is based on the first dimming signal (e.g., based on the DC dimming signal). The combiner 15 is configured to receive a second modified signal (e.g., waveform 3) at input 1008. The second modified signal is based on the second dimming signal (e.g., based on the AC dimming signal). The combiner 15 is configured to transmit the third dimming signal at output 1012 (e.g., to MOSFET 13). The combiner 15 is an operational amplifier (op amp).

Figure 11:
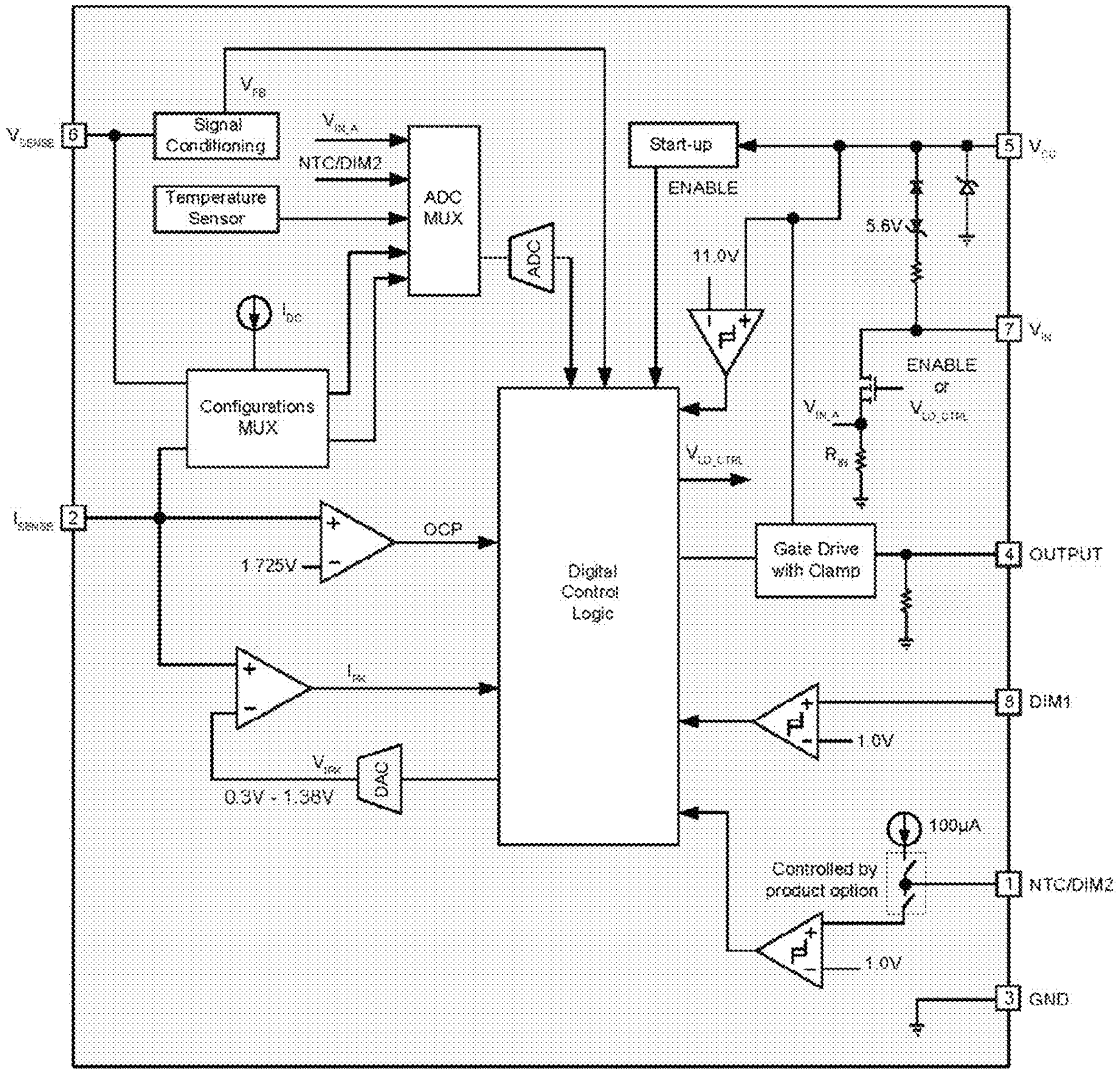
FIG. 11 is a diagram of an embodiment of a PWM controller.

FIG. 11 is a diagram of an embodiment of a PWM controller. In some embodiments, DIM1 is configured to receive the AC dimming signal (or a modified AC dimming signal) and DIM2 is configured to receive the DC dimming signal (or a modified DC dimming signal).

Figure 12:
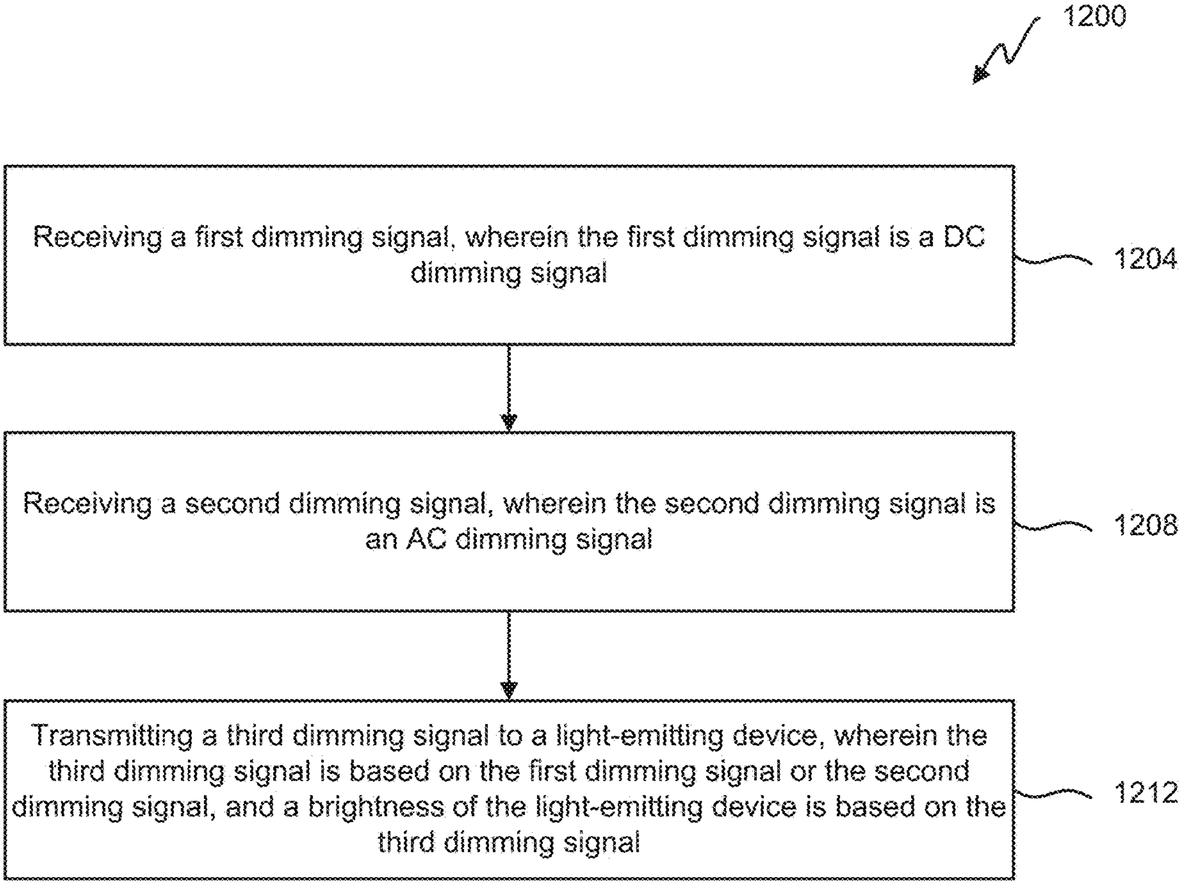
FIG. 12 is a flowchart of an embodiment of a method for a dual-dimming light fixture.

FIG. 12 is a flowchart of an embodiment of a process 1200 for a dual-dimming light fixture. Process 1200 begins in step 1204 with receiving a first dimming signal, wherein the first dimming signal is a direct current (DC) dimming signal. For example, the DC dimming signal is received from DC dimmer 304 in FIG. 3.

In step 1208, a second dimming signal is received, wherein the second dimming signal is an alternating current (AC) dimming signal. For example, the second dimming signal is received from AC dimmer 308 in FIG. 3.

In step 1212, a third dimming signal is transmitted to a light-emitting device. For example, the third dimming signal is transmitted from Vout filter 12 to light-emitting device 204 in FIG. 3. The third dimming signal is based on the first dimming signal or the second dimming signal. A brightness of the light-emitting device is based on the third dimming signal.

In some configurations, various features described herein, e.g., methods, apparatus, computer readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A lighting system comprising:
a first light-emitting device;
a second light-emitting device;
a bus line configured to:
transmit a first dimming signal to a first controller and to a second controller, wherein the first dimming signal is generated from a direct current (DC) dimming signal; and
transmit a second dimming signal to the first controller and to the second controller, wherein the second dimming signal is generated from an alternating current (AC) dimming signal;
the first controller configured to:
receive the first dimming signal;
receive the second dimming signal; and
transmit a third dimming signal to the first light-emitting device, wherein:
the third dimming signal is based on the first dimming signal or the second dimming signal; and
a brightness of the first light-emitting device is based on the third dimming signal; and
the second controller configured to:
receive the first dimming signal;
receive the second dimming signal; and
transmit a fourth dimming signal to the second light-emitting device, wherein:
the fourth dimming signal is based on the first dimming signal or the second dimming signal; and
a brightness of the second light-emitting device is based on the fourth dimming signal.

2. The lighting system of claim 1, wherein the second controller is configured to turn off the second light-emitting device if the first light-emitting device is turned off.

3. The lighting system of claim 1, wherein:
the first light-emitting device and the first controller are in a housing of a first light fixture; and
the second light-emitting device and the second controller are in a housing of a second light fixture.

4. A lighting system comprising:
a light-emitting device; and
a controller configured to:
receive a first dimming signal, wherein the first dimming signal is a direct current (DC) dimming signal;
receive a second dimming signal, wherein the second dimming signal is an alternating current (AC) dimming signal; and
transmit a third dimming signal to the light-emitting device, wherein:
the third dimming signal is based on either the first dimming signal or the second dimming signal but not both at the same time; and
a brightness of the light-emitting device is based on the third dimming signal.

5. The lighting system of claim 4, wherein the light-emitting device and the controller are in a housing of a light fixture.

6. The lighting system of claim 5, wherein the housing is coupled with a bracket configured to rotate with respect to the housing.

7. The lighting system of claim 4, wherein:
the first dimming signal is a 0-10V dimming signal; and
the second dimming signal in an electronic low voltage (ELV) dimming signal.

8. The lighting system of claim 4, wherein:
the controller comprises a combiner; and
the combiner is configured to:
receive a first modified signal, wherein the first modified signal is based on the first dimming signal;
receive a second modified signal, wherein the second modified signal is based on the second dimming signal; and
transmit the third dimming signal.

9. The lighting system of claim 8, wherein the combiner in an operational amplifier.

10. The lighting system of claim 8, wherein the controller is configured to modify the second dimming signal to generate the second modified signal, wherein the second dimming signal is modified by:
converting the second dimming signal from a pulse-width modulation signal into a digital pulse-width modulation signal, to generate a converted signal; and
filtering the converted signal using a voltage follower to generate the second modified signal.

11. The lighting system of claim 10, wherein modifying the second dimming signal further comprises rectifying the second dimming signal before converting the second dimming signal from the pulse-width modulation signal into the digital pulse-width modulation signal.

12. The lighting system of claim 4, wherein the light-emitting device emits light using only light emitting diodes.

13. The lighting system of claim 4, wherein the controller is an application specific integrated circuit.

14. The lighting system of claim 4, wherein the controller prioritizes the DC dimming signal if the controller receives the DC dimming signal and the AC dimming signal concurrently.

15. The lighting system of claim 4, further comprising a bus line, wherein:
the light-emitting device is a first light-emitting device;
the controller is a first controller;
the lighting system comprises a second light-emitting device and a second controller;
the bus line is configured to:
transmit the first dimming signal to the first controller and to the second controller;
transmit the second dimming signal to the first controller and to the second controller; and
the second controller is configured to:
receive the first dimming signal;
receive the second dimming signal; and
transmit a fourth dimming signal to the second light-emitting device, wherein:
the fourth dimming signal is based on the first dimming signal or the second dimming signal; and
a brightness of the second light-emitting device is based on the fourth dimming signal.

16. The lighting system of claim 15, wherein the second controller is configured to turn off the second light-emitting device if the first light-emitting device is turned off.

17. A method for a lighting system comprising:
receiving a first dimming signal, at a controller, wherein the first dimming signal is a direct current (DC) dimming signal;
receiving a second dimming signal, at the controller, wherein the second dimming signal is an alternating current (AC) dimming signal; and
transmitting, using the controller, a third dimming signal to a light-emitting device, wherein:
the third dimming signal is based on either the first dimming signal or the second dimming signal but not both at the same time; and
a brightness of the light-emitting device is based on the third dimming signal.

18. The method of claim 17, wherein the controller does not check what type of light-emitting device is used.

19. The method of claim 17, wherein:
the controller comprises a combiner; and
the method further comprises:
receiving a first modified signal at the combiner, wherein the first modified signal is based on the first dimming signal;
receiving a second modified signal at the combiner, wherein the second modified signal is based on the second dimming signal; and
transmitting the third dimming signal from the combiner.

20. The method of claim 19, further comprising:
converting the second dimming signal from a pulse-wide modulation signal into a digital pulse-width modulation signal, to generate a converted signal; and
filtering the converted signal using a voltage follower to generate the second modified signal.

* * * * *